(12) United States Patent
Chartrel et al.

(10) Patent No.: US 10,633,560 B2
(45) Date of Patent: Apr. 28, 2020

(54) CROSS-LINKING METHOD AND ASSOCIATED DEVICE

(75) Inventors: Jean Francois Chartrel, Cuts (FR); David Goubard, Compiegne (FR); Nicolas Sajot, Paris (FR); Johan Gerrit Jan De Jonge, Apeldoorn (NL)

(73) Assignee: BOSTIK SA, La Plaine Saint Denis (FR)

( * ) Notice: Subject to any disclaimer, the term of this patent is extended or adjusted under 35 U.S.C. 154(b) by 490 days.

(21) Appl. No.: 13/977,096

(22) PCT Filed: Dec. 26, 2011

(86) PCT No.: PCT/IB2011/055957
§ 371 (c)(1),
(2), (4) Date: Jun. 28, 2013

(87) PCT Pub. No.: WO2012/090151
PCT Pub. Date: Jul. 5, 2012

(65) Prior Publication Data
US 2013/0299074 A1 Nov. 14, 2013

(30) Foreign Application Priority Data

Dec. 28, 2010 (FR) .................................... 10 61294
Nov. 4, 2011 (EP) .................................... 11187950

(51) Int. Cl.
*C09J 7/20* (2018.01)
(52) U.S. Cl.
CPC ............... *C09J 7/20* (2018.01); *Y10T 156/10* (2015.01)
(58) Field of Classification Search
CPC ............. Y10T 428/27; Y10T 428/2839; Y10T 428/2848; Y10T 428/2852; Y10T 428/2857
See application file for complete search history.

(56) References Cited

U.S. PATENT DOCUMENTS 3,347,433 A 10/1967 Bernard
4,002,794 A * 1/1977 Schwarcz .................... 428/352
(Continued)

FOREIGN PATENT DOCUMENTS

EP 0931800 A1 7/1999
EP 1195405 A1 4/2001
(Continued)

OTHER PUBLICATIONS

Hagan, J.W. and Kenneth C. Stueben, "Pressure-Sensitive Adhesives" in Adhesives in manufacturing, Gerald L. Schneberger, ed., Marcel Dekker, Inc., 1983.*
(Continued)

*Primary Examiner* — Scott R. Walshon
*Assistant Examiner* — Elaine M Vazquez
(74) *Attorney, Agent, or Firm* — Millen White Zelano and Branigan, PC; John Sopp

(57) ABSTRACT

The invention relates to a method for cross-linking a cross-linkable adhesive composition without solvent on a film, comprising driving and/or guiding said film in a climatic chamber, by a Caroll-type drive or guide.
The invention also relates to a climatic chamber comprising a Caroll-type drive or guide.
The invention also relates to a process for manufacturing a self-adhesive article comprising at least a substrate and an adhesive layer, said process comprising the steps of: a) conditioning an adhesive composition at a temperature of between 20 and 160° C.; b) coating the adhesive composition b1) onto at least a part of the substrate or b2) onto a non-sticking support; submitting the article obtained at step b) to a controlled atmosphere.
The invention also relates to self-adhesive articles having high coating weights and to processes for bonding them.

22 Claims, 6 Drawing Sheets

(56) References Cited

U.S. PATENT DOCUMENTS

| | | | |
|---|---|---|---|
| 4,862,827 A | 9/1989 | Getson | |
| 5,990,257 A | 11/1999 | Johnston et al. | |
| 7,671,144 B2 | 3/2010 | Fujimoto et al. | |
| 8,535,798 B2* | 9/2013 | Poivet et al. | 428/355 N |
| 8,691,909 B2* | 4/2014 | LaFerte et al. | 524/499 |
| 2002/0077420 A1 | 6/2002 | Chiba et al. | |
| 2007/0152192 A1 | 7/2007 | Kirk | |
| 2007/0167584 A1 | 7/2007 | Fujimoto et al. | |
| 2009/0291279 A1* | 11/2009 | Schroeer et al. | 428/214 |
| 2011/0052912 A1* | 3/2011 | Poivet et al. | 428/355 N |

FOREIGN PATENT DOCUMENTS

| | | | |
|---|---|---|---|
| EP | 1715015 A1 | 10/2006 | |
| EP | 2336260 A1 | 6/2011 | |
| GB | 1474224 | 5/1977 | |
| JP | 3149277 | 6/1991 | |
| JP | 6158023 | 6/1994 | |
| JP | 2000190346 A | 7/2000 | |
| JP | 2001049075 A | 2/2001 | |
| JP | 2004079853 A | 3/2004 | |
| WO | WO 2009/106699 | * 9/2009 | C09J 175/08 |

OTHER PUBLICATIONS

Skeist, Irving, ed., "Handbook of Adhesives", Third Edition, Chapman & Hall, 1990, p. 658.*
International Search Report for PCT/IB2011/055957 (dated Nov. 15, 2012).
Machine Translation of JP 6158023 date of publication Jun. 7, 1994.
English Abstract of JP 3149277 date of publication Jun. 25, 1991.
Machine Translation of JP-2000190346, Publication Date: Jul. 11, 2000, Applicants: INOAC Corp INOAC Elastomer KK.
English Abstract of JP2001049075, Publication Date: Feb. 20, 2001, Applicants Kanegafuchi Chem Ind Co Ltd.
English Abstract—Bibliographic data: JP2004079853 (A)—Mar. 11, 2004.

* cited by examiner

Fig. 1 - Prior Art

CROSS-LINKING METHOD AND ASSOCIATED DEVICE

FIELD OF THE INVENTION

The invention relates to a novel method of cross-linking a cross-linkable adhesive composition by heating, and associated device.

The invention also relates to a process for the production of a self-adhesive article said article comprising at least a substrate and an adhesive layer. More specifically, the invention relates to a new process for cross-linking a curable adhesive composition. It also relates to improved self-adhesive articles which can be obtained by that process.

TECHNOLOGICAL BACKGROUND

Pressure-sensitive adhesives (also called self-adhesives) or PSAs are substances that give the support coated therewith an immediate adhesivity (often called "tack") at room temperature, which allows its instantaneous adhesion to a substrate under the effect of brief slight pressure. PSAs are widely used for the manufacture of self-adhesive labels which are fastened to articles for the purpose of presenting information (such as a barcode, name, price) and/or for decorative, or also medical purposes. PSAs are also used for the manufacture of self-adhesive tapes for various uses. Mention may be made, for example, besides the transparent adhesive tape widely used in daily life, of: the forming and assembling of cardboard packaging; the protection of surfaces for painting works, in construction; holding electrical cables in the transport industry; the bonding of carpets by double-sided adhesive tapes.

With a view to the manufacture of self-adhesive labels and/or tapes, PSAs are often applied by continuous coating processes to the entire surface of a (where appropriate printable) support layer of large dimensions, in an amount (generally expressed in g/m²) and denoted herein below by the term "weight per unit area". The support layer is constituted of paper or film of polymer material having one or more layers. The adhesive layer that covers the support layer may itself be covered with a protective non-stick layer (often called a "release liner"), for example composed of a siliconized film. The multilayer system obtained is generally packaged by being wound up in the form of large reels of up to 2 m in width and 1 m in diameter, which can be stored and transported. These films on the reels can also be converted into self-adhesive tapes by cutting and packing in rolls of determined width and length. At this stage, the adhesive layer must be sufficiently cured to avoid bleeding problems. Bleeding problems correspond to the adhesive material flowing away from its original place through a lack of mechanical resistance to shear. Shear conditions can be created by temperature, roll tension, pressure and mechanical effects, and bleeding (also named oozing phenomenon) can appear usually at the sides of the rolls, creating issues with handling, storage and also contamination by dust and undesired particles. It is also essential for the manufactured self-adhesive article that the adhesive layer be sufficiently cured to avoid transfer of adhesive material to surfaces with which it is contacted, notably the user's skin. On the other hand, too strong curing removes any adhesive properties.

Self-adhesive tapes and labels are generally produced with adhesives that are reactive or not, in solvent phase. The purpose of the solvents is to facilitate the mixing, dosing, pumping, etc. during the production of these adhesives and their use, but above all to facilitate their coating in a thin layer, which after evaporation will create the self-adhesive surface. The low dry solids content of these adhesives ensures an application rheology (viscosity) adapted to roller sizing and drying. However, the use of solvents is subject to increasingly strict regulation, and solvents are intended to disappear.

More recently some production lines have been operated with adhesives in the aqueous phase. In this case, although the problems inherent to solvents are avoided, the whole problem of drying the coating remains. (Drying must be progressive for reasons of appearance, water has a high enthalpy of evaporation compared with those of the usual solvents, and here again requires heating and powerful ventilation and extraction. Drying must also be total).

In most cases, drying ovens adapted to the production of self-adhesive tapes and labels (in particular high-performance ones) have an effective length of 10 to 100 meters, are heated by pulsed air (80° C. to 180° C.) and are equipped with powerful extraction means in order to complete the drying, and in the case of adhesives in the solvent phase, in order to keep the emitted vapours below their explosion limit. These methods are very energy-intensive, noisy and heavy in term of maintenance. Indeed, the energy necessary to evaporate water from the coated adhesive composition is very high; thus, the process is not satisfying with regards to energy demand, therefore it is dissatisfying from an environmental point of view.

Whether organic solvent or water is used as a media to coat adhesive material, the liquid form is a hinderance to reaching very high coating weights. Above 150 g/m², even above 70 g/m², these more or less liquid coatings, before a significant part of evaporation takes place, would be very difficult to keep in place on a moving non-stick support, as would the necessary machine steps to create a finished assembly.

Thus, for high coating weights, it is necessary to perform the coating in more than one step, which becomes not only a technical hurdle but also is not of any industrial efficiency.

Recently, solvent-free reactive technologies with 100% dry solids have been developed, in particular HMPSA (Hot Melt PSA) and UV cure PSA (generally acrylic PSAs, cross-linkable by UV exposure), and even more recently STPU-PSA Hot-Cure, for example a composition which is hot cross-linkable (and in the presence of moisture). In order to obtain satisfactory properties, such a technology uses a moisture level adapted to the quantity of adhesive (in general terms stoichiometric), and a relatively high temperature (50° C. to 180° C., preferably between 80° C. and 160° C. and most often between 100 and 140° C.) in order to obtain the desired conversion rate in a defined period of time, compatible with the size of the ovens and the production line speeds.

Although this kind of adhesive can be usually coated at high coating weight due to the fact that they can solidify very rapidly after the coating process under cooling conditions, there are some difficulties to achieve high performances in term of mechanical and thermal resistance.

Especially when dealing with conventional HMPSAs that are not intended to be cross-linked adhesives, there is typically a lack of mechanical and thermal resistance due to the molecular weight level of molecules comprised in the adhesive materials. To take examples based on thermal resistance, and with very few exceptions that are difficult to be considered as industrially viable, hot melt adhesive bonding solutions cannot withstand temperature exceeding 150° C. for more than few minutes. A vast majority of applications for HMPSAs would not be workable once surrounding temperature reached more than 100° C. Overall, the polymeric materials involved become soft, or very soft to possibly liquid.

Thus the aim of cross-linking is to increase the molecular weight of molecules, typically polymers, in order to enhance mechanical and thermal resistance to the adhesive material, thus to the adhesive bond. Cross-linking can be performed by chemical reactions, in the presence or not of various possible compounds including catalysts, co-catalyst, water, acidic functions, peroxides, peroxide-activated intermediates, etc. Temperature, radiations, and pressure conditions can be used to enhance speed or effect of these reactions.

In particular, the method used for the cross-linking of adhesives, whether Hot-Melt Pressure-Sensitive Adhesive (HMPSA) or not, is UV curing. According to this method which is often used with 100% solid adhesive (no solvent, no water as media to help the coating process), the adhesive composition is coated onto a surface and the coated support is submitted to ultraviolet radiation. For example, for radical polymerization processes, cross-linking can only be performed on the surface up to a thickness of about 100 microns; indeed, the radiation acts superficially and once the composition is cross-linked at the surface, the cross-linked surface prevents the penetration of the radiation and cross-linking of the internal layer of the composition is not possible.

Thus, for high coating weights, it is necessary to perform the cross-linking in several or many successive steps. Such a process includes a succession of coating steps each followed by a UV curing step. Another disadvantage of the UV curing method with radical polymerization processes is that the cross-linking is stopped as soon as the composition is no longer exposed to ultraviolet radiation; thus, cross-linking cannot continue after the product exits from the end of the production line, for example during storage.

Another method for cross-linking HMPSAs can be the electron-beam method. This method requires very expensive systems, thus is not economically viable.

Although it may require a controlled moisture level and a high temperature in order to ensure that the reaction is rapid, the reactive technology based on thermal cross-linking contains no solvent and requires only a very low level of extraction (mainly useful for the satisfactory operation of the regulation system in the oven or chamber). The fact that it is no longer necessary to dry the coating as in the case of solvent- or water-based technologies allows the use of more compact ovens, namely having an oven or stove-type design and no longer of the dryer type. But the very tacky nature of the coatings prohibits all contact with surfaces, even those treated with non-stick materials (Fluorocarbon (Teflon®) or plasma treatment for example). The systems can be horizontal or vertical, but in all cases must be linear.

In some fields of application of PSAs, it is desirable that the adhesive strength of the labels and/or tapes on the article be resistant to temperature variations. For example, it can be desirable that the adhesive strength be maintained when the adhesive joint that provides the fastening is exposed (and also, therefore, the article coated with the label and/or tape) at a temperature capable of varying over a wide range. Mention may be made, by way of example, of stickers for use on certain components of motor vehicles (or other vehicles) located in the vicinity of the engine, or stickers for use on packaging designed to receive a hot liquid during the conditioning thereof, or else stickers for use on articles (such as tires) which are labeled when hot, at the end of production lines. Mention may also be made of the use of self-adhesive tapes for the assembly of parts for which a good thermal resistance is necessary such as in the case, for example, of the interior trim of aircraft or other vehicles.

Document WO 2009/106699 describes a heat-cross-linkable adhesive composition based on a polyurethane comprising two alkoxysilane-type end groups.

Document EP 2 336 208 describes a heat-cross-linkable adhesive composition, said composition being based on a polyether comprising two hydrolysable alkoxysilane-type end groups.

The compositions of both documents result, after coating on a carrier followed by curing, in a pressure-sensitive adhesive that has advantageous adhesive strength and tack properties. Furthermore, the adhesive joint providing the attachment to an article of the self-adhesive support thus obtained retains the required adhesive strength over a wide temperature range.

Those documents do not mention the production of a self-adhesive article which can be used right after exit from the production line. Besides, those documents do not teach how to obtain a self-adhesive article with a coating weight higher than 500 g/m$^2$.

The curing time needed to obtain these advantageous adhesion properties is a particularly important parameter from the point of view of the industrial production of self-adhesive articles. This is because it determines the dimensions of the apparatus wherein the adhesive composition is cured, and also the corresponding residence time of the coated adhesive layer, or else the energy consumption, and therefore the productivity of the process as a whole. In order to be applicable at industrial scales, a process for the manufacture of adhesive articles must present the following characteristics: short residence time in the apparatus for the curing and high curing level at the exit from the production line. Especially, it is expected that the product can be cut and transported right after exit from the production line, without any bleeding problems.

FIG. 1 shows a system according to the state of the art based on vacuum-box suction, allowing the tape to be reversed, with the adhesive-coated side facing the inside of the loop. Obviously, such a system is complex, difficult to control and high-cost.

There is therefore a need for a thermal cross-linking method which is compact, yet still avoids contact between the adhesive material and the different elements of the device, and has a simple and robust design.

One objective of the present invention is also to obtain a Pressure-Sensitive Adhesive with a homogeneous cross-linking using a one step coating process.

SUMMARY OF THE INVENTION

The invention relates to a method for cross-linking a cross-linkable adhesive composition without solvent on a film, comprising driving and/or guiding said film in a climatic chamber, by a Caroll-type drive or guide.

Particular embodiments are as follows:

the adhesive composition is an HMPSA adhesive composition.

the adhesive composition is an adhesive composition comprising: 20 to 85% of a polyurethane or polyether comprising 2 hydrolyzable alkoxysilane type end groups; 15 to 80% of a compatible tackifying resin; and 0.01 to 3% of a cross-linking catalyst.

the temperature in the climatic chamber is comprised between 50° C. and 200° C., preferably between 80° C. and 160° C. and advantageously between 100 and 150° C. and/or the relative humidity is comprised between 30 and 90% RH, preferably approximately 50% RH.

the film forms parallel or zigzag corrugations by passing over multiple tension rollers.

the climatic chamber comprises at the bottom a series of Caroll-type rollers or wheels and at the top a series of solid cylinders or another series of Caroll-type rollers or wheels.

the rollers or wheels are mounted mobile on the supporting shaft.

the rollers or wheels are motorized or free-running.

the film in the Caroll-type drive or guide is cut by a rotary cutting system with a magnetic cylinder and removable plates.

the rollers or wheels are associated with backing rolls or backing wheels.

the method comprises a stage of double coating on both sides of the film.

the method also further comprises a cutting stage for trimming to size.

the entrance into and exit from the chamber are situated on the same side, on opposite sides or on adjacent sides.

the film is preheated to a temperature close to the temperature of the chamber before the cross-linking.

the film is perforated.

The invention also relates to a climatic chamber comprising a Caroll-type drive or guide.

Particular embodiments are as follows:

the temperature in the climatic chamber is comprised between 50° C. and 200° C., preferably between 80° C. and 160° C. and advantageously between 100 and 150° C. and/or the relative humidity is comprised between 30 and 90% RH, preferably approximately 50% RH.

the climatic chamber comprises at the bottom a series of Caroll-type drive rollers or wheels and at the top a series of solid cylinders or another series of Caroll-type rollers or wheels.

the rollers or wheels are mounted mobile on the supporting shaft.

the rollers or wheels are motorized or free-running.

the chamber comprises a multiplicity of tension rollers.

the chamber is associated with a Caroll-type drive or guide cutting device comprising a rotary cutting system with a magnetic cylinder and removable plates.

the rollers or wheels are associated with the backing rolls or backing wheels.

the chamber is associated with a cutting device for trimming to size.

The invention is based on the use of a so-called Caroll-type drive (and/or guide); namely based on using the edges of the film, generally with the presence of holes allowing a mechanical driving or guiding, or perforated strip. The invention makes it possible to obtain one or more of the advantages below with a cross-linkable solvent-free adhesive:

compactness, as the adhesive-coated face can travel with the coating facing the shaft, giving a smaller footprint;

a significant saving in terms of investment, but above all, in terms of operation (energy saving, reduced maintenance);

easier temperature and humidity adjustment of the chamber (or oven);

possibility of coating on both sides.

Additionally, the present invention proposes a process for manufacturing a self-adhesive article comprising at least a substrate and an adhesive layer, said process comprising the steps of:

a) conditioning an adhesive composition, comprising at least a silyl-containing polymer, a tackifying resin and a catalyst, at a temperature of between 20 and 160° C.;

b) coating the adhesive composition onto:
  b1) at least a part of the substrate; or
  b2) a non-stick support;

c) submitting the article obtained at step b) to a temperature comprised between 20 and 200° C. and to a humidity level characterized by an atmosphere in which between 5 and 100% of the molecules are water molecules; and if b2) is chosen, then d) depositing the substrate onto the adhesive composition before step c) or onto the adhesive layer after step c).

According to one embodiment, the process further comprises a step e) of submitting the article obtained after step c) to a temperature comprised between 20 and 200° C., preferably between 30 and 180° C., more preferably between 40 and 160° C.

According to one embodiment, the coating at step b1) is performed onto at least 50% of the substrate, preferably at least 75% of the substrate, more preferably at least 95% of the substrate.

According to another embodiment, the coating of the substrate is performed onto at least a part of both sides of the substrate.

According to one embodiment, the substrate is a grid or a mesh or a non-woven substrate.

According to another embodiment, the substrate is a release liner.

According to one embodiment, at step b) of the process, the quantity of adhesive composition coated on the carrier is comprised between 10 and 1500 g/m$^2$, preferably between 50 and 1300, more preferably between 600 and 1300 g/m$^2$.

According to one embodiment, at step c) of the process, the humidity level is characterized by an atmosphere in which between 10 and 90% of the molecules are water molecules, preferably between 15 and 70% of the molecules are water molecules and the temperature is comprised between 30 and 180° C., preferably between 40 and 160° C.

According to one embodiment, step c) of the process is performed in an apparatus equipped with an external ventilation circuit comprising a heat exchanger.

According to one embodiment, steam is injected into the external ventilation circuit.

According to one embodiment, steam is dry vapour.

According to one embodiment, at step c) the article obtained from prior step is submitted to a treatment by dry vapour exposure (=100% water molecules) and optionally to a further treatment by a regulated (lower) quantity of water molecules.

According to one embodiment, steam injection is regulated by a Proportional-Integral-Derivative controller.

The present invention further proposes a self-adhesive article capable of being obtained by the process of the invention, comprising at least a substrate and an adhesive layer, wherein the coating weight of said adhesive layer is comprised between 600 and 1500 g/m$^2$.

According to one embodiment, the coating weight of the adhesive layer is comprised between 800 and 1300 g/m$^2$.

According to one embodiment, the adhesive layer is further covered with a release liner.

According to one embodiment, the back side of the substrate is a non-stick layer.

According to one embodiment, the substrate is a tape.

The present invention further proposes a process for bonding the self-adhesive article of the invention onto a surface comprising the steps of:
a) removing the protective non-stick layer when said layer is present;
b) applying the article onto the surface; and
c) applying a pressure onto the article.

According to one embodiment, the adhesion of the self-adhesive article to the surface is characterized by a shear resistance at ambient temperature under 1 kg of higher than 10 minutes, preferably higher than 1 day, more preferably higher than 10 days.

An advantage of the present invention is the production of a self-adhesive article with a homogeneous cross-linking.

Another advantage of the present invention is the production of a self-adhesive article which can be conditioned right after the exit of the production line.

Another advantage of the present invention is the production of a self-adhesive article having a superior shear resistance at the exit of the production line.

A further advantage of the present invention is the production of a high coating weight adhesive using only one pass coating process.

BRIEF DESCRIPTION OF THE FIGURES

The invention is described with reference to the following Figures.

DESCRIPTION OF EMBODIMENTS OF THE INVENTION

The invention will now be described in further detail (hereinafter, the term driving also covers guiding, unless specifically stated otherwise).

Figure 1:
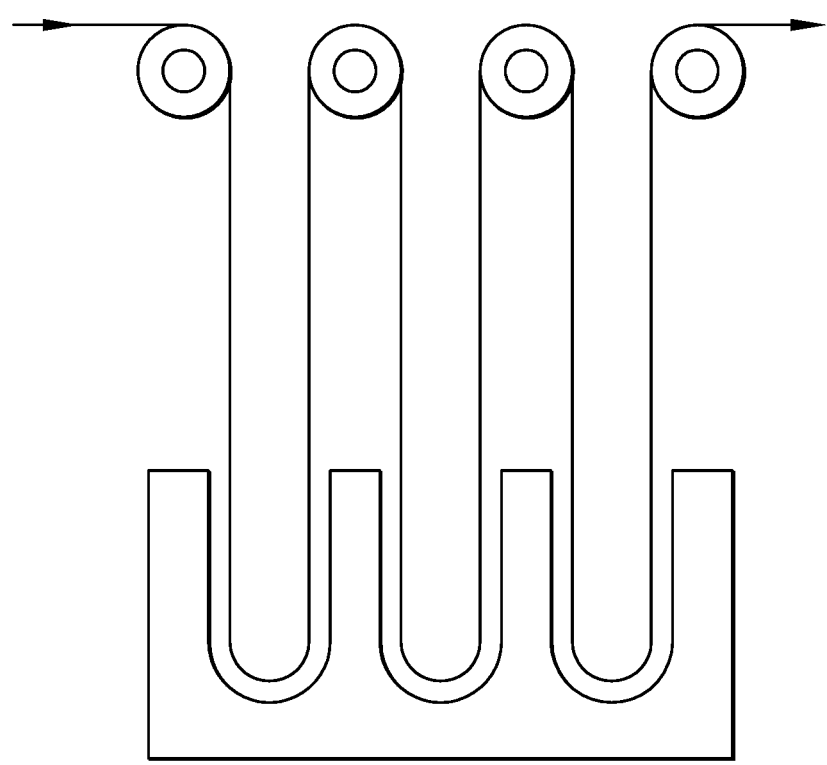
FIG. 1 shows a diagram of a commercially available oven.
Figure 2:
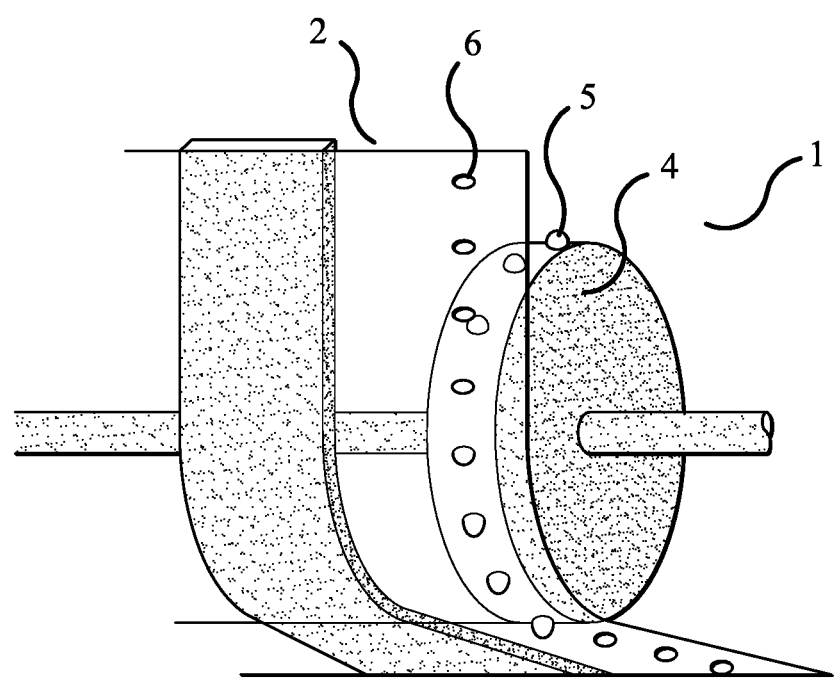
FIG. 2 shows a view of a Caroll-type drive.

FIG. 2 shows a view of a Caroll type drive (1). This type of drive is named after its inventor, and is used in many industries, in particular office equipment and "punching" or lateral cutting of media (paper, card, etc.) for their transport (conveying, gear transmission), detection (mechanical sensors or optical detection), automation, etc. The cut (2) is here shown as being on the side, but can be in the middle, or multiple for extra-wide films or large reel widths.

The support film receiving the adhesive layer according to the invention is therefore perforated with a Caroll-type cutout. Such a cutout can be made at high speed (>100 m/minute) on most supports: papers treated with non-stick materials (silicone- or kaolin-treated), label papers, thermoplastic films (polyolefines, polyester, polyamide, etc.).

Cutting can be carried out either by conventional linear or rotary systems (punch/die type) or by rotary-cut magnetic cylinder systems with removable plates (consumable plates placed on the magnetic cylinders, the magnetism holding the plates on the cylinder). Rotary cutting with magnetic cylinders and removable plates allows rapid change of tooling, change in the design of the perforations, and can be combined with a waste removal system (compressed air, suction). In this way the perforated film and the work environment are generally kept clean (the very light chads produced by the punching tend, in the absence of effective suction, to become affixed to surfaces due to electrostatic effect).

Rotary cutting with magnetic cylinders and removable plates is adapted to frequent changes of reel width. Such cutting allows the path to be adjusted rapidly, by centring or automatic adjustment at one edge (calibrated on one edge of the roller).

Via this cutting a film is obtained that is intended to receive a deposit of a cross-linkable adhesive without solvent. This film support is driven or guided in the chamber by Caroll-type drives.

Figure 3:
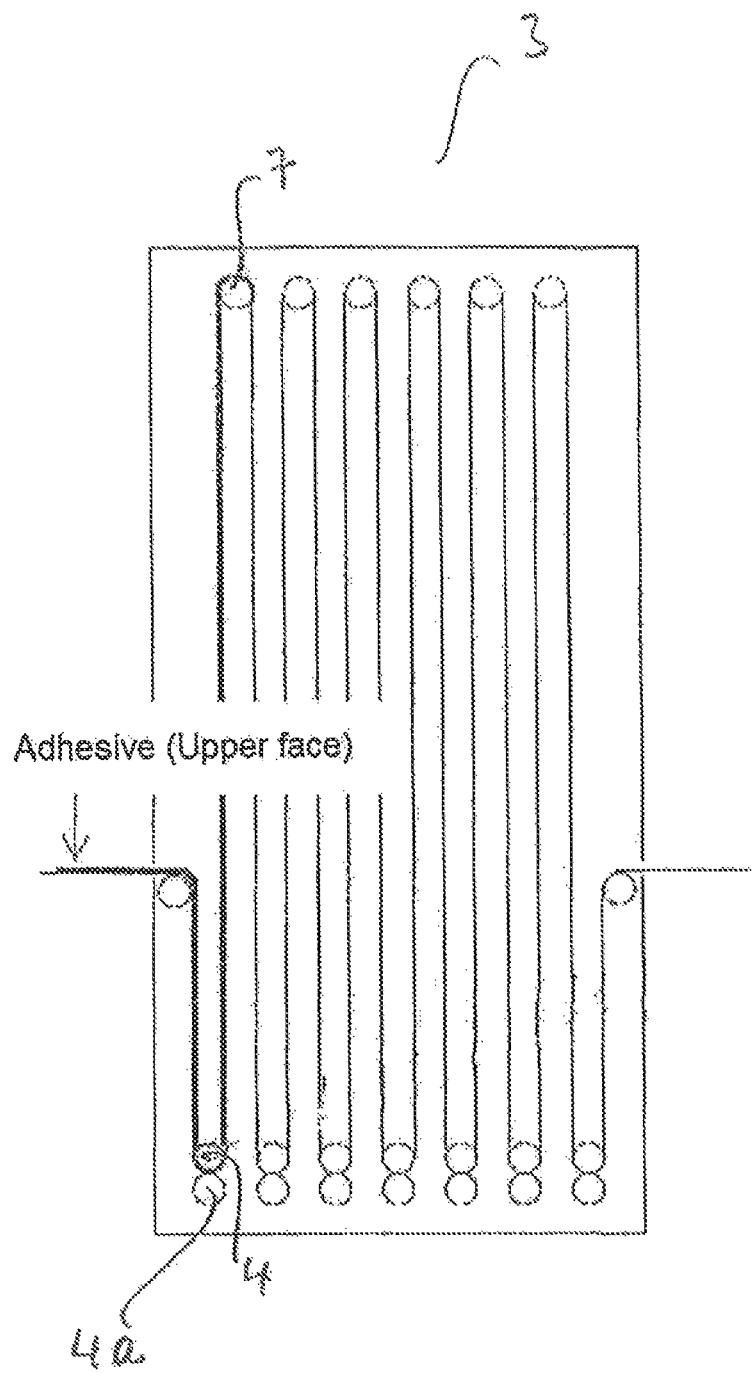
FIG. 3 shows a cross section view of a climatic chamber with a Caroll-type drive.

FIG. 3 shows by way of example a climatic chamber (3) with Caroll-type drive, the compact nature of which is evident. For a useful oven length of 25 meters, the floor length is less than 2 meters, or even less than 1.5 meters (for a height of the order of 2 to 3 meters). The residence time in the climatic chamber corresponds to that of a 25-meter dryer having only a single passage according to the state of the art. This compactness offers an improved thermal and hygrometric control with respect to a conventional linear dryer. In the chamber shown, the film forms parallel loops (parallel corrugation). The spacing of the rollers/wheels would lead to the formation of a zigzag (zigzag corrugation).

The presence of a Caroll-type drive therefore makes it possible to have the adhesive-coated face turned towards the drive shaft, but without the adhesive-coated face, which is tacky for at least some part of the procedure, touching fixed or moving parts of the oven.

The Caroll-type drives (and/or guides) can be of different types. Generally, these are rollers or wheels (4) fitted with spikes (5) which are embedded in the holes of the tape (6). Various shapes can be provided for the holes (circular, square or any other shape), and it can also be provided that friction on a suitable support alone is sufficient for the drive or at intermediate levels. The rollers or wheels can be free-running, the film being moved simply by a traction system outside the climatic chamber. The rollers or wheels can be motorized, entirely or only partially, in the upper, and/or lower and/or middle part. The wheels also serve to guide the film and/or prevent vibration during the transfer of the film. The motorization of the wheels can be synchronous, in order to manage the film tension and avoid breaks.

Where cutting the Caroll cavities in a film takes place in direct association with the oven, the distance between the Caroll rollers can be adjusted to the desired width. One of the wheels can be fixed on the shaft, while the spacing with the outer (or if applicable the middle) wheel, can be controlled according to the location of the Caroll cavities made in the film. The wheel is then translatably mobile on the shaft in order to adapt the width of the perforated film.

In the embodiment of FIG. 3, and in the case of single face adhesive coating, the upper rollers (7) can be standard, namely solid. In fact, as the inner face of the film is not adhesive-coated, it can rest on standard cylinders.

The conditions in the chamber are variable, according to the nature of the adhesive. Generally the temperature, like the relative humidity, is regulated in order to obtain cross-linking of the adhesive. The temperature in the chamber is thus typically comprised between 50° C. and 200° C., preferably between 80° C. and 160° C. and advantageously between 100 and 150° C.; the temperature also takes account of the nature of the film (chemical nature and thickness of the film). The relative humidity, which can be controlled or not, is advantageously controlled, and generally comprised between 30 and 90% RH, preferably approximately 50% RH. It can also be provided to regulate only the temperature in the case of adhesive systems which are 100% hot-cure or only the humidity in the case of adhesive systems which are 100% moisture-cure. Generally, adhesive systems are hot- and moisture-cure.

It is also possible to provide baffles in the chamber, in order to define different areas inside the chamber. Different conditions, in particular temperature, can be provided in the different areas of the chamber.

If needed, temperature and humidity regulation is carried out in various ways. The heating can be internal or external, generally external. Extractor means can be provided in order to improve the regulation, as even a low flow is useful to this end. Vapour (if necessary dry vapour) can also be injected, while still avoiding condensation on the film forming the support.

In the operation of the chamber, the film entering the chamber can advantageously be pre-heated, in order to benefit immediately from the efficiency of the oven (the first meter inside the oven is then available for cross-linking and not for increasing the temperature of the film).

Figure 4:
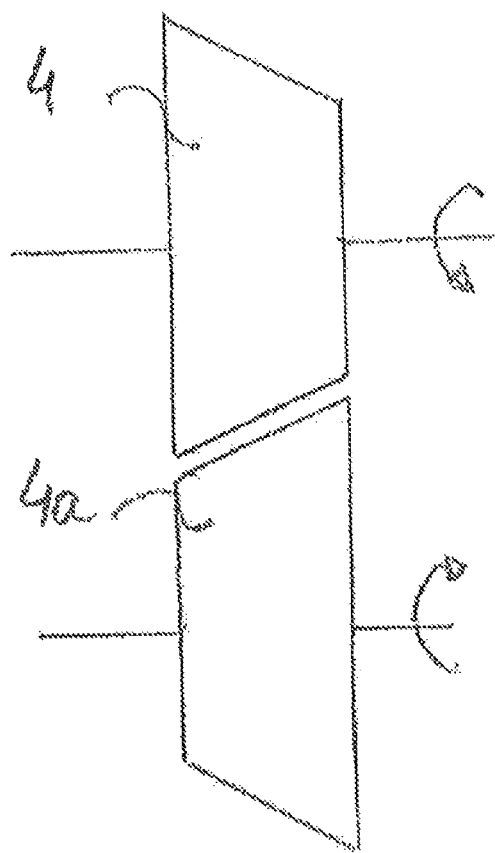
FIG. 4 represents a roller and backing roll of a Caroll-type drive.

Backing rolls (4a) can also be provided, as depicted in FIG. 4 (and indicated in FIG. 3). The presence of backing rolls can be useful for the purposes of the drive by distancing the motorization, can also allow guiding, and can also be useful in order to avoid tears and/or buckling (crumpling between rollers). The (optional) complementary tapered shape shown also makes it possible, by exerting pressure between the rollers, to tension (widen) the film by mechanical adjustment.

The invention also allows double application of adhesive or double coating on both sides. This can be useful for two adhesive layers, one on each face, as the composition of the two adhesive layers can be identical or different. This can also be useful in the case of the application of a non-stick layer called a "release" layer on the other face of the film. In fact, it is often necessary to provide a non-stick layer in order to be able to wind the film that has received the adhesive. One possibility consists of coating the other face with for example a silicone emulsion, such that during winding the film presents this non-stick silicone layer beside the adhesive layer. In the state of the art, it was necessary to reverse the film with a complex system of tension rollers and to return the film with the silicone coating to the dryer, controlling the operation of which presented further problems.

On leaving the chamber or oven, the lateral (or as the case may be, middle) perforated area is removed by cutting (trimming to size, slitting). The waste produced (of the order of 5 to 7%) is then recycled. The costs associated with this part of the method correspond to the current costs associated with lateral cutting. Lateral cutting is in fact necessary as it is currently not possible in practice to coat 100% of the useful surface area with adhesive, while it is equally impossible in practice to achieve a perfect multiple of the width of the adhesive tapes or labels for all of the articles produced in a unit. A scrap rate of the order of 10%, or even more, is usual.

The entrance into and exit from the chamber with Caroll-type drive can be on the same side, on opposite sides or adjacent. The flexibility in defining the entry and exit makes it possible to have only one operator for the various operations on a production line which conventionally requires two.

The invention also relates to the chamber comprising a Caroll-type drive system. The chamber thus comprises a system of multiple tension rollers using Caroll-type drive wheels or rollers.

According to one embodiment of the invention, the climatic chamber further comprises heating means which allow the temperature to be maintained between 50° C. and 200° C.

According to one embodiment of the invention, the climatic chamber further comprises moisture-control means which allow the relative humidity to be maintained between 30% and 90% RH.

Any type of film forming a support can be used, such as for example polyethylene, polypropylene, polyester (for example PET), polyamide.

The adhesive which is coated on a film is a solvent-free cross-linkable PSA adhesive. Mention may be made of the adhesives that are the subject of patent applications EP0106330, CA2554743 and WO09/106,699. Mention may also be made of the adhesives that are the subject of the French applications in the name of the Applicant filed under the Nos. 07/09027 (published as FR2925517 and WO2009106699) and 09/06194, the content of which is incorporated herein by way of reference. The adhesive is in particular a polyurethane- or polyether-based adhesive. Such adhesive can comprise:

20 to 85% of a polyurethane or polyether comprising 2 hydrolyzable alkoxysilane type end groups;
15 to 80% of a compatible tackifying resin; and
0.01 to 3% of a cross-linking catalyst.

Preferably, the hot cross-linkable adhesive composition comprises from 40 to 65% polyurethane or polyether and 35 to 60% tackifying resin.

According to an embodiment, the adhesive composition comprises a polyurethane comprising 2 hydrolyzable alkoxysilane type end groups and having the Formula (Ia):

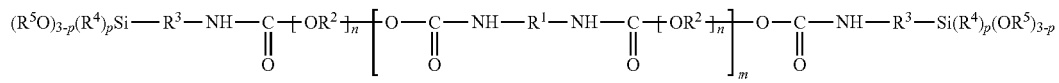

in which:
- $R^1$ represents a hydrocarbon-based divalent radical comprising from 5 to 15 carbon atoms which can be aromatic or aliphatic, linear, branched or cyclic;
- $R^2$ represents a linear or branched alkylene divalent radical comprising from 1 to 4 carbon atoms;
- $R^3$ represents a linear alkylene divalent radical comprising from 1 to 3 carbon atoms;
- $R^4$ and $R^5$, identical or different, each represent a linear or branched alkyl radical with 1 to 4 carbon atoms, with the possibility when there are several $R^4$ (or $R^5$) radicals that these are identical or different;
- n is an integer such as the number average molar weight of the polyether block of Formula $—[OR^2]_n—$ is comprised between 300 Da and 30 kDa;
- m is an integer such that the number average molar weight of the polymer of Formula (Ia) is comprised between 600 Da and 60 kDa;
- p is an integer equal to 0, 1 or 2.

The polyurethane of Formula (Ia) contained in the composition according to the invention can be obtained according to the following method.

In a first step, a polyurethane is prepared comprising 2 hydroxyl end groups and having the formula (IIa):

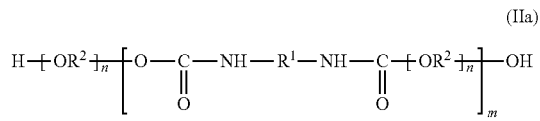
(IIa)

by reacting one mole of diisocyanate of Formula (IIIa):

NCO—$R^1$—NCO (IIIa)

with approximately two moles of a polyether diol of Formula (IVa):

H—$[OR^2]_n$—OH (IVa)

which corresponds to a number ratio of the NCO/OH functions equal to approximately 0.5.

The reaction takes place at a temperature comprised between 60 and 90° C., for a period of approximately 2 to 8 hours, and optionally in the presence of a catalyst.

In a second step, the polyurethane of Formula (IIa) is converted into a polyurethane of Formula (Ia) by a silylation reaction with an isocyanatosilane of Formula (Va):

NCO—$R^3$—Si$(R^4)_p(OR^5)_{3-p}$ (Va)

at a rate of approximately one mole of polyurethane of Formula (II) for 2 moles of the compound of Formula (Va).

These 2 synthesis steps are conducted in anhydrous conditions, so as to avoid hydrolysis of the alkoxysilane groups. A typical temperature range for carrying out these reactions is 30° to 120° C., and more particularly 60 to 90° C. A minor variation relative to the stoechiometries given previously can be envisaged without difficulty, on condition however that it does not exceed 10% in the first step (synthesis of the polyurethane of Formula IIa) and 2% in the second step (synthesis of the polyurethane of Formula Ia).

Reference is made to European patent EP 0 931 800 for further details concerning the preparation of the polyurethane of Formula (Ia) having terminal groups of the alkoxysilane type.

According to another embodiment, the adhesive composition comprises a polyether comprising 2 hydrolyzable alkoxysilane type end groups, having a viscosity measured at 23° C. ranging from 25 to 40 Pa·s and for Formula (Ib):

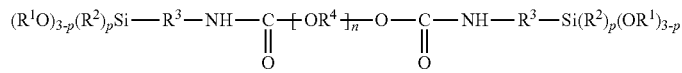

in which:
- $R^1$ and $R^2$, identical or different, each represent a linear or branched alkyl radical with 1 to 4 carbon atoms, with the possibility when there are several $R^1$ (or $R^2$) radicals that these are identical or different;
- $R^3$ represents a linear or branched alkylene divalent radical comprising from 1 to 6 carbon atoms;
- $R^4$ represents a linear or branched alkylene divalent radical comprising from 1 to 4 carbon atoms;
- n is an integer such that the number average molar weight Mn of the polymer of Formula (I) is comprised between 20 kDa and 40 kDa;
- p is an integer equal to 0, 1 or 2;

The polymer of Formula (Ib) contained in the composition according to the invention can be obtained by reacting a polyether diol of Formula (IIb):

H—$[OR^4]_n$—OH (IIb)

with an isocyanatosilane of Formula (IIIb):

NCO—$R^3$—Si$(R^2)_p(OR^1)_{3-p}$ (IIIb)

at a rate of approximately one mole of polyether diol of Formula (IIb) for 2 moles of the compound of Formula (IIIb).

The polyether diols of Formula (IIb) are widely available commercially, as are the isocyanatosilanes of Formula (IIIb). Mention may be made by way of example of gamma-isocyanato-n-propyl-trimethoxysilane which is available under the name Geniosil® GF 40 or also alpha-isocyanato-n-methyl-methyldimethoxysilane which is available under the trade name Geniosil® XL 42, both from the company Wacker.

This synthesis step is conducted in anhydrous conditions, in order to avoid hydrolysis of the alkoxysilane groups. A typical temperature range for carrying out this reaction is from 30° to 120° C., and more particularly from 60 to 90° C. A minor variation relative to the stoechiometries given previously can be envisaged without difficulty, on condition however that it does not exceed 2%.

Polyethers of Formula (Ib) are also commercially available.

The resin is a compatible tackifying resin, having a number average molar weight comprised between 200 Da and 5 kDa, and chosen from the resins capable of being obtained:
  (i) by polymerization of terpenic hydrocarbons and phenols, in the presence of Friedel-Crafts catalysts, or
  (ii) by polymerization of alpha-methyl styrene, and optionally by reaction with phenols.

As regards the tackifying resins which can be contained in the composition according to the invention, by the term "compatible tackifying resin" is meant a tackifying resin which, when mixed in the proportions 50%/50% with the polymer of Formula (I), gives a substantially homogenous mixture. Such resins are commercially available and from those capable of being obtained by methods (i) and (ii) defined above, the following products may be mentioned:

method (i): Dertophene® 1510 available from the company DRT having a molar mass Mn of approximately 870 Da; Dertophene® H150 available from the same company, having a molar mass Mn of approximately 630 Da; Sylvarez® TP 95 available from the company Arizona Chemical having a molar mass Mn of approximately 1200 Da;

method (ii): Norsolene® W100 available from the company Cray Valley, which is obtained by polymerization of alpha-methyl styrene without action of phenols, with a number molar mass of 900 Da; Sylvarez® 510 which is also available from the company Arizona Chemical with a molar mass Mn of approximately 1740 Da, the method of obtaining which includes the action of phenols.

The cross-linking catalyst that can be used in the composition according to the invention can be any catalyst known to a person skilled in the art for silanol condensation. Mention may be made as examples of catalysts, of organic derivatives of titanium such as titanium acetyl acetonate (commercially available under the name TYZOR® AA75 from the company DuPont), aluminium such as aluminium chelate (commercially available under the name K-KAT® 5218 from the company King Industries), amines such as 1,8-diazobicyclo (5.4.0) undecene-7 or DBU.

The hot cross-linkable adhesive composition according to the invention can be prepared by a method which comprises:

a step of mixing in the absence of air, preferably under an inert atmosphere, of the polymer of Formula (I) with the tackifying resin(s), at a temperature comprised between 50 and 170° C., preferably between 100 and 170° C., then a step of cooling said mixture to a temperature ranging from 50 to 90° C., and advantageously approximately 70° C., then a step of incorporating the catalyst into said mixture and, if applicable, desiccant and other optional constituents.

The coating step is carried out in standard fashion by means of known coating devices, such as for example a lip- or curtain-type nozzle, or also with a roller. It uses a weight per unit area of adhesive composition ranging from 3 to 500 g/m$^2$, preferably 10 to 250 g/m$^2$. The material that can be used for the support layer is for example paper or a film of a polymer material having one or more layers, as indicated above.

The time necessary for the cross-linking can vary within wide limits, for example between 1 second and 10 minutes, preferably between 30 seconds and 5 minutes. The residence time in the climatic chamber is adapted in consequence.

This step of thermal cross-linking results in the creation— between the polymer chains of the polyurethane or polyether and under the action of moisture—of siloxane-type bonds which lead to the formation of a three-dimensional polymer matrix. The adhesive composition that is cross-linked in this way is a pressure-sensitive adhesive which confers the desired adhesivity and tack onto the support coated therewith.

The invention is not limited to the description of coating of a hot-melt adhesive that is heat-cross-linkable without solvent, but can find applications in other fields, such as for example adhesive-coating of paper and generally the transport (conveyance, transfer) of supports in the form of films having received a coating of a bonding material at a point in the process. In such fields, it is sought to avoid any contact between the adhesive parts and the device. An accumulator can be provided, applying the Caroll-type drive principle.

Another object of the invention concerns a device comprising:

means for coating an adhesive composition on a film,
a climatic chamber according to the invention,
driving means to introduce the film coated with the adhesive composition into the climatic chamber.

According to one embodiment of the invention, the device further comprises means of applying a release liner at the exit of the climatic chamber.

According to one embodiment of the invention, the device further comprises adhesive tape winding means at the exit of the climatic chamber.

The invention also provides a process for manufacturing a self-adhesive article comprising at least a substrate and an adhesive layer, said process comprising the steps of:

a) conditioning an adhesive composition comprising at least a silyl-containing polymer, a tackifying resin and a catalyst at a temperature comprised between 20 and 160° C.;
b) coating the adhesive composition onto:
   b1) at least a part of the substrate; or
   b2) a non-stick support;
c) submitting the article obtained at step b) to a temperature comprised between 20 and 200° C. and to a humid atmosphere in which between 5 and 100% of the molecules are water molecules; and
if b2) is chosen, then
d) depositing a substrate onto the adhesive composition before step c) or onto the adhesive layer after step c).

As used herein, the term "self-adhesive article" is meant to include any article which can be bonded onto a surface only by the action of a pressure with the hand or with an item of equipment, without the use of additional adhesives. By "self-adhesive article" is also to be understood a Pressure Sensitive Adhesive. Those articles aim at exposing a PSA surface for use for sticking to other surfaces for closing, maintaining, fastening, or simply immobilizing, exposing forms, logos, pictures or information. Those articles can be used in many fields, such as the medical, packaging, automobile or construction field. They can be shaped according to their final application, for example in the form of tapes, such as industrial tape, DIY tape, single or double sided tape, double sided tape made out of single or multiple or no carrier, tape made with specific carriers like open or closed cell foams, grids or composite or textile or extruded or laminated webs, or in the form of labels, bandages, wound dressings, PSA coated thick pads, road marking tapes or labels, graphic art PSA films.

By "substrate" it is to be understood a support layer which is coated by the adhesive composition in the article according to the invention. The substrate may have any shape, but comprises at least one face which is approximately flat, on which the adhesive layer is coated and which can be applied to a surface for adhering thereupon. The substrate may have two identical or different faces, with identical or different chemical natures and/or identical or different mechanical properties, in order to be adapted to many self-adhesive article shapes according to their final applications.

The substrate may be based on any kind of materials that can be used according to the need for making PSA articles, such as tape or label articles. For example, polypropylene, polyethylene and paper are base stock material for such a carrier, as well as any useful plastic or fibrous web that can be handled to form such articles; fabric, metal fiber or glass fiber based materials can also be used for some applications. According to one embodiment of the invention, the substrate is a carrier based on polyethylene terephthalate (PET).

According to one embodiment, one side of the substrate sticks to the adhesive layer (front side) and the other side is further covered with a non-stick layer, for example a layer made in a siliconized material (back side). In this case, the self-adhesive article obtained can be easily reeled thanks to the presence of a non-stick layer on the back side of the substrate. Said non-stick layer does not adhere to the adhesive layer, such that there is no adhesive transfer between the non-stick layer and the adhesive layer. According to another embodiment, one side (back side) of the substrate is treated in order to be non-stick. Said substrate presents the same advantage as the substrate covered with a non-stick layer.

According to one embodiment, the carrier is a grid or a mesh or a non-woven material. In this case, the adhesive layer may be present on one surface of the carrier, but can also penetrate inside the carrier during its application because of the porous nature of the carrier so that the fibers of which the substrate is made are entirely coated by the adhesive composition. In this case, a release liner is preferably present on the adhesive layer or adhesive composition.

According to another embodiment, the substrate is a release liner. The release liner is intended to be removed before application onto a surface for adhering thereupon. Preferably, the release liner (also called a protective non-stick layer) is made of siliconized film or paper, for example said layer is based on cross-linked polydimethylsiloxane-based material. Typically, this release liner has a thickness of about one micrometer. According to one embodiment, the release liner may have two different surfaces; said surfaces may be made with two different materials.

Also, the substrate can be pre-treated by any technique, like plasma, corona treatments, or abrased, or pre-coated, to modify surface tensions or in general to help with any of features to be given to the finished assembly.

As used herein, the "adhesive layer" is the cured adhesive composition obtained in the end of the process. The adhesive composition according to the invention is preferably any hot melt adhesive, namely that is applied at temperatures higher than 50° C., preferably 70° C., more preferably 90° C. with no significant quantity of solvent (typically less than 5% by weight based on the total weight of the material), has a loop tack representing a PSA behaviour of a minimum of 0.039 N/cm after at least partially curing the silylated functions, preferably with no residues, on glass plate. Said adhesive composition comprises at least 5% by weight of an oligomer or a polymer or a large molecule with an average molecular weight comprised between 100 and 250,000 g/mol, preferably between 200 and 80,000 g/mol, preferably between 500 and 60,000 g/mol and a chemical structure comprising between 0.01 and 4 mol/kg, preferably between 0.1 and 3.5 mol/kg of silylated functions.

Herein, by "curing" it is to be understood "cross-linking".

According to the present invention, the "adhesive composition" is a solvent-free cross-linkable Pressure-Sensitive Adhesive (PSA). This composition comprises at least a polymer or a mixture of polymers, a tackifying resin or a mixture of tackifying resins and a catalyst.

The polymer is a silyl-containing polymer with no significant quantity of solvent, typically less than 5% by weight based on the total weight of the material. By "silyl-containing polymer" is meant an oligomer or a polymer or a large molecule with an average molecular weight comprised between 200 and 80,000 g/mol, preferably between 500 and 60,000 g/mol and having a chemical structure comprising between 0.1 and 4 mol/kg of silylated functions. Said silylated functions can be grafted at the extremities of the polymer or at any part of the polymer chain. By "silylated functions" is meant a function having the following formula (I):

wherein:

$R^4$ and $R^5$, which are identical or different, each represent a linear or branched alkyl radical having 1 to 4 carbon atoms, with the possibility, when there are several $R^4$ (or $R^5$) radicals, that these are identical or different, p is an integer equal to 0, 1 or 2.

According to one embodiment, the adhesive composition of the invention is of the type described in documents WO 2009/106699 or EP 2 336 208.

According to one embodiment, the adhesive composition comprises a silyl-terminated polyurethane having the following formula (Ia):

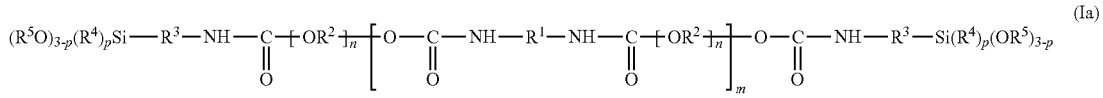

wherein:

$R^1$ represents a hydrocarbon-based divalent radical comprising from 5 to 15 carbon atoms which may be aromatic or aliphatic, linear, branched or cyclic, $R^2$ represents a linear or branched alkylene divalent radical comprising from 1 to 4 carbon atoms, $R^3$ represents a linear alkylene divalent radical comprising from 1 to 3 carbon atoms, $R^4$ and $R^5$, which are identical or different, each represent a linear or branched alkyl radical having 1 to 4 carbon atoms, with the possibility, when there are several $R^4$ (or $R^5$) radicals, that these are identical or different, n is an integer such that the number-average molecular weight of the polyether block of formula —$[OR^2]_n$— is between 300 Da and 30 kDa, m is an integer such that the number-average molecular weight of the polymer of formula (Ia) is between 600 Da and 60 kDa;

p is an integer equal to 0, 1 or 2.

According to another embodiment, the adhesive composition comprises a silyl-terminated polyether having the following formula (Ib):

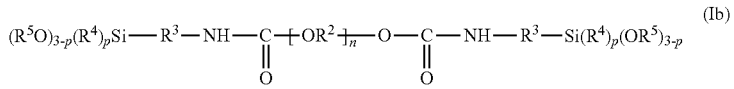

wherein:

$R^1$ represents a linear or branched alkylene divalent radical comprising from 1 to 4 carbon atoms, $R^3$ represents a linear alkylene divalent radical comprising from 1 to 6 carbon atoms, $R^4$ and $R^5$, which are identical or different, each represent a linear or branched alkyl radical having 1 to 4 carbon atoms, with the possibility, when there are several $R^4$ (or $R^5$) radicals, that these are identical or different, n is an integer such that the number average molecular weight of the polymer of formula (Ib) is between 20 kDa and 40 kDa, p is an integer equal to 0, 1 or 2.

As regards the tackifying resin(s) which are included in the composition according to the invention, the expression "compatible tackifying resin" means a tackifying resin which, when it is mixed in 50%/50% by weight proportions with the polymer gives a substantially homogeneous blend.

The resins are advantageously chosen from:

(i) resins obtained by polymerization of terpene hydrocarbons and phenols, in the presence of Friedel-Crafts catalysts;

(ii) resins obtained by a process comprising the polymerization of [alpha]-methyl-styrene, said process possibly also including a reaction with phenols;

(iii) natural or modified rosins, such as for example the rosin extracted from pine gum, wood rosin extracted from tree roots and their derivatives that are hydrogenated, dimerized, polymerized or esterified by monoalcohols or polyols such as glycerol;

(iv) resins obtained by hydrogenation, polymerization or copolymerization (with an aromatic hydrocarbon) of mixtures of unsaturated aliphatic hydrocarbons having around 5, 9 or 10 carbon atoms derived from petroleum fractions;

(v) terpene resins, generally resulting from the polymerization of terpene hydrocarbons such as, for example, monoterpene (or pinene) in the presence of Friedel-Crafts catalysts;

(vi) copolymers based on natural terpenes, for example styrene/terpene, [alpha]-methylstyrene/terpene and vinyl-toluene/terpene; or else (vii) acrylic resins having a viscosity at 100° C. of less than 100 Pa·s.

Such resins are commercially available and among those of type (i), (ii) and (iii) defined above, mention may be made of the following products:

resins of type (i): DERTOPHENE® 1510 available from DRT that has a molecular weight Mn of around 870 Da; DERTOPHENE® H150 available from the same company with a molecular weight Mn equal to around 630 Da; SYLVAREZ® TP2040HME available from Arizona Chemical; SYLVAREZ® TP 95 available from Arizona Chemical having a molecular weight Mn of around 1200 Da;

resins of type (ii): NORSOLENE® W100 available from Cray Valley, which is obtained by polymerization of [alpha]-methylstyrene without the action of phenols, with a number-average molecular weight of 900 Da; SYLVAREZ® 510 which is also available from Arizona Chemical with a molecular weight Mn of around 1740 Da, the production process of which also comprises the addition of phenols;

resins of type (iii): SYLVALITE® RE 100 which is a pentaerythritol rosin ester available from Arizona Chemical and having a molecular weight Mn of around 1700 Da.

According to one preferred embodiment, use is made, as resin, of a resin chosen from those of type (i) or (ii).

According to another preferred embodiment, use is made, as resin, of a resin of type (iii) and preferably a rosin ester.

The curing catalyst that can be used in the composition according to the invention may be any catalyst known to a person skilled in the art for silanol condensation. Mention may be made, as examples of such catalysts, of organic derivatives of titanium such as titanium acetyl acetonate (commercially available under the name TYZOR® AA75 from DuPont), of aluminium such as aluminium chelate (commercially available under the name K-KAT® 5218 from King Industries), of amines such as 1,8-diazobicyclo [5.4.0]undec-7-ene or DBU.

According to one preferred embodiment, the curable adhesive composition comprises from 40 to 65% of the silyl-containing polymer and from 35 to 60% of tackifying resin(s).

Optionally, the adhesive composition according to the invention may also include, in combination with the silyl-containing polymer, thermoplastic polymers often used in the preparation of HMPSAs, such as ethylene vinyl acetate (EVA) or styrene block copolymers.

The curable adhesive composition according to the invention may also comprise up to 3% of a hydrolysable alkoxysilane derivative, as a desiccant, and preferably a trimethoxysilane derivative. Such an agent advantageously prolongs the shelf life of the composition according to the invention during storage and transport, before the use thereof. Mention may be made, for example, of [gamma]-methacryloxypropyltrimethoxysilane available under the trade name SILQUEST® A-174 from US Momentive Performance Materials Inc.

The adhesive composition according to the invention may also include a plasticizer such as a phthalate or a benzoate, a paraffinic and naphthenic oil (such as PRIMOL® 352 from Esso) or else a wax of a polyethylene homopolymer (such as A-C® 617 from Honeywell) or a wax of a polyethylene/vinyl acetate copolymer, or else pigments, dyes or fillers.

Finally, an amount of 0.1 to 2% of one or more stabilizers (or antioxidants) is preferably included in the composition according to the invention. These compounds are introduced to protect the composition from degradation resulting from a reaction with oxygen which is capable of being formed by action of heat or light. These compounds may include primary antioxidants which trap free radicals and are, in particular, substituted phenols such as IRGANOX® 1076 from Ciba. The primary antioxidants may be used alone or in combination with other secondary antioxidants or UV stabilizers.

The adhesive composition is conditioned at a temperature comprised between 20 and 160° C. This step is performed by any known methods, such as by mixing and if necessary by heating the adhesive composition in a drum-unloader.

Then, the conditioned adhesive composition is either coated onto at least a part of a substrate or onto a non-stick support.

The non-stick support may be the belt conveyor of the winding/unwinding system used to circulate the adhesive composition or any non-stick supports which are used to temporarily support the adhesive composition without sticking to it during the production of the self-adhesive article.

According to option b2), the non-stick support is used as a temporary support for the adhesive composition/layer before the final substrate is contacted with this adhesive composition/layer.

In the case wherein the coating is performed onto a non-sticking support, at least one substrate is then deposited onto the adhesive composition or adhesive layer, before or after the curing step.

In the case wherein the coating is performed onto a non-stick support, at least one substrate is then deposited onto the adhesive composition or adhesive layer, before or after the curing step.

In the case wherein the substrate is deposited onto the adhesive composition or adhesive layer (step d), the adhesive composition or adhesive layer covers at least 50% of the substrate, preferably at least 75% of the substrate, still more preferably at least 95% of the substrate.

The coating step is carried out using known coating devices, such as for example a lipped die or a curtain-coating type die, or else a roll. According to one embodiment of the invention, the quantity of adhesive composition coated onto the substrate or onto the non-stick support is comprised between 10 and 1500 $g/m^2$, preferably between 50 and 1400 $g/m^2$, more preferably between 600 and 1300 $g/m^2$.

According to one embodiment, the coating of the adhesive composition is performed onto at least a part of a release liner. According to this embodiment, the adhesive layer obtained after curing has enough mechanical resistance without any carrier inside. Indeed, after removal of the release liner and application onto a surface for adhering thereupon, solely the adhesive layer remains on the surface; the adhesive layer has enough mechanical resistance to ensure its adhesive function without the presence of a substrate.

According to one embodiment, the substrate is in a discrete form like a grid or a mesh or a non-woven material. In this case, the substrate can be put in contact with soft or liquid adhesive composition in order that it is surrounded by the adhesive layer once cured. The use of a substrate in a discrete form, like a grid or a mesh or a non-woven material, permits to manufacture a self-adhesive article which can be easily cut without any particular equipment.

The coating weight is to be adapted to the desired application of the article. The production of low coating weight can be made very quickly, with a high production rate, since it requires a short curing time. On the contrary, if the surface to be bonded is uneven or irregular, an adhesive film with high coating weight is desirable; planar junctions can also be compensated by high coating weight adhesive films.

The invention is particularly remarkable in that it allows the adhesion to uneven or irregular surfaces. The possibility to coat the substrate or the non-stick support with a high weight of adhesive permits adhesion to surfaces which are irregular, like a closed or open cell foam surface, a mesh or a grid surface, like structured fiber-made surfaces like textile sheets, unstructured/random fiber-made surfaces like non-woven webs, and also like brazed metals, embossed surfaces and curved surfaces, whether made of plastics or metal or composites, as well as semi-gloss and dull metal and painted or varnished or printed surfaces. This description is not limitative and also relates to the material or surface state of the substrate itself. Under the pressure applied on the article, the adhesive layer will compensate the volume of holes or unevenness in the surface.

Preferably, the coating is made uniformly onto the substrate or the non-stick support but the coating can also be adapted to the desired shape of the final article.

According to one embodiment, the coating of the adhesive composition is performed onto at least a part of both sides of the substrate. If both sides of the substrate are coated, the adhesive composition may be the same or different on both sides, and the coating weight can be the same or different on both sides.

According to another embodiment of the invention, the self-adhesive article comprises an adhesive layer on at least a part of one or both sides of the substrate, said adhesive layer(s) being optionally covered with a release liner. Preferably, the release liner is made of siliconized film or paper, for example said layer is based on cross-linked polydimethylsiloxane-based material. Typically, this release liner has a thickness of about one micrometer. According to one embodiment, the self-adhesive article comprises two release liners surrounding the adhesive composition. In this case, both release liners can be made of similar or different materials and/or they can have the same or different thicknesses.

According to one embodiment, a substrate is placed onto a winding/unwinding system. Preferably, the winding/unwinding system used comprises several points of pinching which are correlated together to ensure along the winding/unwinding path the right parallelism of films, edge matching, and rewind roll perfect tension and aspect, with no tunnelling, telescoping, wrinkling or any unwanted defects.

Preferably, the coating is conducted at a temperature comprised between 40 and 150° C.

Then, the coated adhesive composition is submitted to a temperature comprised between 20 and 200° C., preferably between 30 and 180° C., more preferably between 40 and 160° C. and to a humid atmosphere in which between 5 and 100% of the molecules, preferably between 10 and 90% of the molecules, more preferably between 15 and 70% of the molecules are water molecules. The curing of the adhesive composition is thus performed. According to the nature of the adhesive composition, the curing time is adapted.

According to another embodiment, the process of the invention further comprises a step e) wherein the adhesive composition is only submitted to a temperature comprised between 20 and 200° C., preferably between 30 and 180° C., more preferably between 40 and 160° C. The temperature at step e) may be the same as or different than the temperature at step c).

In the case wherein the coating b) is performed onto at least a part of the substrate, the further optional step e) is performed after step c).

In the case wherein the coating b) is performed onto a non-stick support, the further optional step e) is also performed after step c) but this step e) may be performed before or after step d) of depositing a substrate onto the adhesive layer.

The humidity level is expressed as the percentage of water by volume, which corresponds to the number of molecules of water divided by the total number of molecules in a volume unit. Because of the linear nature of this scale, the humidity level is easy to display and regulate using normal set point P.I.D. (Proportional-Integral-Derivative) controllers. Percentage in weight can be calculated with normal air considering multiplying the percentage of water molecules based on the total number of molecules by a factor of 0.622.

Academic and general information about humidity level in various environments is described by W. Wagner et al., in *"International Steam Tables—Properties of Water and Steam based on the Industrial Formulation IAPWS-IF97"*.

The apparatus used to perform the curing may be any conventional oven, initially designed for drying coatings by removing any solvent quantity, modified to be able to heat up the coating and the coated substrate or non-stick support and to allow temperature and moisture conditions necessary to cure the coating composition of the invention.

The apparatus is a means allowing putting in contact during a certain time a moisture-containing hot air flow with the coated material, so that the material can be heated up and receive moisture as efficiently as possible to reach the targeted curing state and therefore performance features. The apparatus may be open or closed.

According to one embodiment of the invention, the curing step is performed in a ventilated apparatus. Preferably, the ventilated apparatus has an external ventilation circuit. Preferably, the external ventilation circuit comprises a heat exchanger.

Preferably, the humidity level is regulated by the introduction of steam into the external ventilation circuit. According to one embodiment, the steam is dry vapour.

According to one embodiment, the apparatus is a temperature and moisture controlled tunnel. Preferably, this kind of apparatus is used for making low coating weight adhesives.

According to one embodiment of the invention, the apparatus is an oven with forced convection. Preferably, the heating is performed in an external circuit with a heat exchanger. Preferably, the moisture is introduced into the volume of the oven which is traversed by the adhesive composition, thanks to dry vapour injected into the external aeration circuit of the oven. Preferably, the air flow rate is controlled in order to maintain a laminar flow and a sufficient renewal of air in the oven.

The oven aims at promoting the transfer or diffusion of water molecules into the coated material, so that curing can be initiated as fast as possible.

According to one embodiment, the steam injection is regulated by a P.I.D. (Proportional-Integral-Derivative) regulation. For example, for a humid atmosphere in which 60% of the molecules are water molecules, the injection goes on as long as measured humidity level is below this value, and stops while the measured humidity content is above the value of 60% of water molecules.

The oven used to perform the process can be any known ovens which can regulate temperature and moisture content. Those kinds of ovens are already used in some industries, such as food industries or for sterilization processes.

In one embodiment of the invention, the oven can be constituted of a first section wherein the temperature and the moisture content are controlled and a second section wherein only the temperature is controlled.

In document U.S. Pat. No. 5,694,835 are described humidity controlled ovens. In such ovens, useful in food industry, the temperature exceeds 100° C.

In one embodiment of the invention, the oven comprises a "Caroll-type" guiding.

Preferably, in each of the sections wherein steam is injected, moisture-controlling sensors are placed close to the coated surface of the substrate or the non-stick support. For example, a "MAC125 moisture analyzer" from the company Machine Applications Company Instruments is integrated in the P.I.D. regulating system to control and monitor humidity level in each section.

The process of the invention can be implemented in a batch process or in a continuous process.

According to one embodiment, the substrate used in the process is a tape.

According to one embodiment of the invention, the self-adhesive article is intended to make labels, decals, or lettering articles. In that case, the self-adhesive article obtained by the process according to the invention needs to be modified by one or more conversion techniques such as slitting, die-cutting or matrix-stripping.

Figure 5:
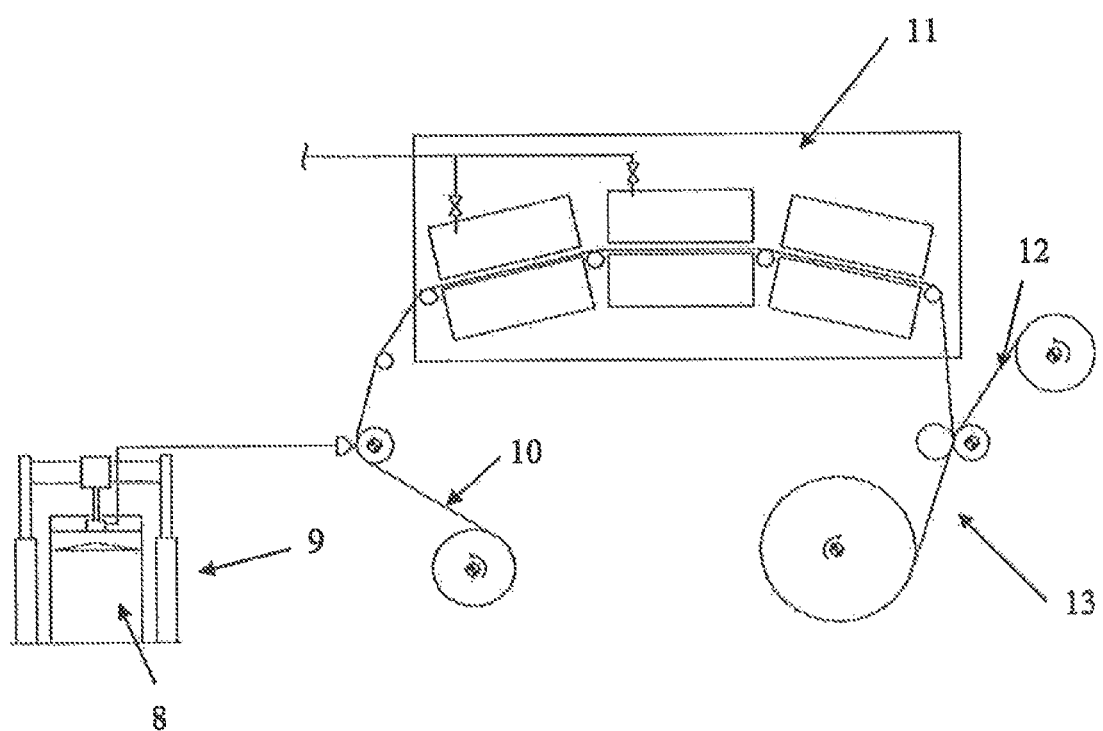
FIG. 5 shows a schematic representation of the process according to one embodiment of the invention.

FIG. 5 illustrates one embodiment of the process according to the invention. The adhesive composition 8 is conditioned at a predetermined temperature in a drum unloader 9. Then, the adhesive composition is coated onto a PET tape deposited on and moving with a belt conveyor 10. The coated substrate is then introduced into an oven 11 wherein said coated substrate is submitted to specific temperature and humidity conditions. At the exit of the oven, a release liner 12 is deposited onto the adhesive layer in order to obtain a self-adhesive article 13, which can further be reeled.

The self-adhesive articles obtained in the end of the process according to the invention may have many different shapes.

Figure 6:
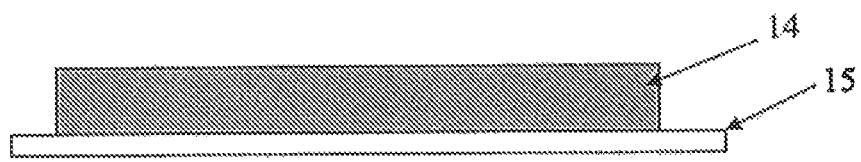
FIG. 6 is a schematic representation of a self-adhesive article obtained by one embodiment of the process according to the invention.

According to one embodiment, the adhesive layer 14 is coated onto a substrate 15 (FIG. 6).

Figure 7:
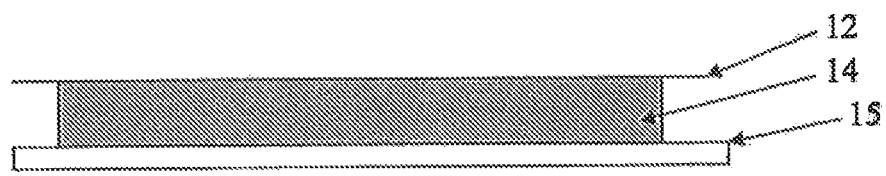
FIG. 7 is a schematic representation of a self-adhesive article obtained by another embodiment of the process according to the invention.

According to another embodiment, a release liner 12 may be deposited onto the adhesive layer 14, said adhesive layer 14 being coated onto a substrate 15 (FIG. 7).

Figure 8:
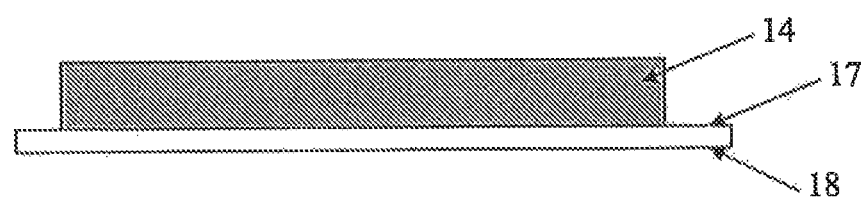
FIG. 8 is a schematic representation of a self-adhesive article obtained by another embodiment of the process according to the invention.
Figure 9:
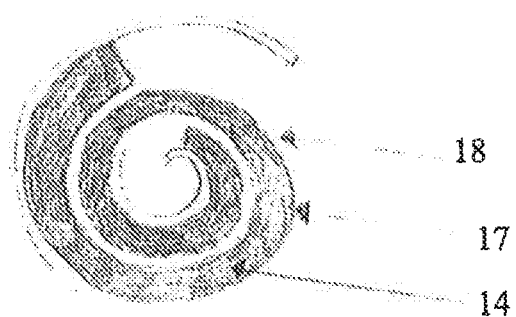
FIG. 9 is a schematic representation of a self-adhesive article obtained by another embodiment of the process according to the invention.

According to one embodiment, one side 17 of the substrate sticks to the adhesive layer 14 and the other side 18 of the substrate is a non-stick layer, for example a layer made in a siliconized material. In this case, the adhesive layer 14 is coated onto the adhering side 17 of the substrate (FIG. 8). According to this embodiment, the self-adhesive article may be wound in a roll (FIG. 9).

Figure 10:
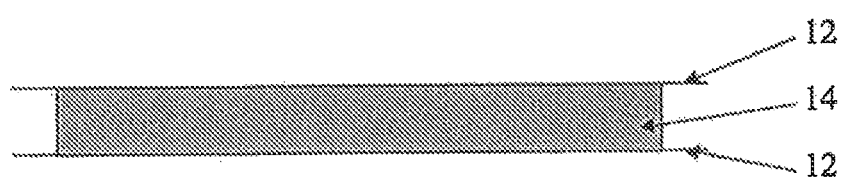
FIG. 10 is a schematic representation of a self-adhesive article obtained by another embodiment of the process according to the invention.

According to another embodiment, the adhesive layer 14 may be surrounded by two release liners 12 (FIG. 10).

According to the process of the invention, the self-adhesive article obtained at the exit of the production line is sufficiently cross-linked for permitting its cutting and its reeling without any bleeding of the adhesive coating.

Thanks to the process of the invention, a self-adhesive article having a very high adhesive coating weight is obtained after only one pass coating process.

The invention further relates to a self-adhesive article capable of being obtained by the process of the invention, comprising at least a substrate and an adhesive layer, wherein the coating weight of said adhesive layer is comprised between 600 and 1500 g/m$^2$, preferably between 800 and 1300 g/m$^2$.

According to one embodiment, the substrate of the self-adhesive article is a tape.

According to one embodiment, the adhesive layer is further covered with a release liner.

According to one embodiment, one side of the tape sticks to the adhesive layer coated onto said side while the other side of the tape (back side) is treated to be non-adhering in order not to stick to the adhesive layer. In this case, the self-adhesive article can be easily reeled without any transfer between the adhesive layer and the back side of the tape.

The invention also relates to a process for bonding the self-adhesive article of the invention onto a surface comprising the steps of:

a) removing the release liner when said release liner is present;

b) applying the article onto the surface; and c) applying a pressure onto the article.

The surface present in the process for bonding according to the invention can be any regular or irregular surface optionally having some holes or unevenness. The surface can be based on any type of materials, such as plastic, paper, metal, concrete, wood, plaster or ceramic, in a form of a mesh or a grid surface, or structured fiber-made surfaces like textile sheets, or unstructured/random fiber-made surfaces like non-woven webs, or brazed metals, or embossed surfaces and curved surfaces, whether made of plastics or metal or composites, or semi-gloss and dull metal or painted or varnished or printed surfaces.

This description is not limitative and also relates to the material or surface state of the substrate itself.

Also, the substrate can be pre-treated by any technique, like plasma, corona treatments, or abrased, or pre-coated, to modify surface tension or in general to help with any of features to be given to the finished assembly. The same kind of treatment can be considered for surfaces that are intended to be bonded by the adhesive surface once it has cured.

According to one embodiment, the adhesion of the self-adhesive article to the surface is characterized by a shear resistance at ambient temperature under 1 kg of higher than 10 minutes, preferably higher than 1 day, more preferably higher than 10 days.

The self-adhesive article of the invention has very good performances, those performances being obtained right at the exit of the production line. The performances of the self-adhesive support can be evaluated by its peel strength, its loop tack and its shear strength. For industrial applications, it is essential to obtain a product at the exit of a production line which can be easily and immediately handled, for example within one hour after its production.

EXAMPLES

1) Preparation of the Compositions

The compositions that appear in the table below are prepared by firstly introducing the tackifying resin (SYL-VAREZ® TP2040HME) into a glass reactor under vacuum and heated to around 160° C. Then, once the resin is thoroughly molten, the silane-containing polymer (DESMOSEAL® S XP 2636 or GENIOSIL® STP-E30) is added.

The mixture is stirred under vacuum for 15 minutes, then cooled to 70° C. The catalyst (K-KAT® 5218 or TIB-KAT® 223) is then introduced. The mixture is kept under vacuum and continues to be stirred for another 10 minutes.

Compositions corresponding to examples 1 to 13 are described in table 1.

2) Preparation of the PET Support Layer Coated with the Composition, with a Coating Weight Comprised Between 50 and 700 g/m$^2$ The composition obtained in 1) is preheated to a temperature close to 100° C. within a drum-unloader and then is purged through a heating pressure hose comprising a nozzle also heated at about 100° C. The heating hose is connected to the nozzle/applicator, the nozzle is entered in contact with substrate surface. Then the adhesive composition is purged through the nozzle mouth and a regular flow is applied, without heterogeneous material like gelled or solid particles.

As the substrate, use is made of a rectangular sheet of polyethylene terephthalate (PET) having a thickness of 50 μm and dimensions of 20 cm by 40 cm which is put on a driving machine. Alternatively, a roll of PET film may be put on a winding/unwinding machine.

At less than 2 meters away from the nozzle position on the machine, the first section of the apparatus is placed in order to perform the curing of the composition.

The apparatus used in the examples are either:

a standard ventilated oven (comparative examples 1, 2, 5 and 6), or a temperature and moisture controlled tunnel connected with steam generator and equipped with exhaust (examples 3 and 4), or a moisture containing ventilated oven with recycled circulating air (examples 7 to 13).

The test conditions are described in table 2.

TABLE 2

| | test conditions | | | |
|---|---|---|---|---|
| | Coating weight (g/m$^2$) | Temperature (° C.) | Residence time (seconds) | Humidity level (% of water molecules) |
| 1 | 50 | 120 | 30 | 2 |
| 2 | 50 | 120 | 20 | 2 |
| 3 | 50 | 120 | 20 | 60 |
| 4 | 50 | 140 | 20 | 60 |
| 5 | 250 | 120 | 300 | 2 |
| 6 | 250 | 140 | 300 | 2 |
| 7 | 250 | 120 | 300 | 23 |

TABLE 1

| | adhesive compositions | | | | | | |
|---|---|---|---|---|---|---|---|
| | DESMOSEAL S XP2636 (% wt) | STPE-30 (% wt) | Irganox 1010 (% wt) | Irganox 245 (% wt) | Kkat 5218 (% wt) | Tib Kat 223 (% wt) | Sylvarez TP 2040 HME (% wt) |
| 1 | 51 | | 0.8 | 0.2 | 2 | | 46 |
| 2 | 51 | | 0.8 | 0.2 | 2 | | 46 |
| 3 | 51 | | 0.8 | 0.2 | 2 | | 46 |
| 4 | 51 | | 0 8 | 0.2 | 2 | | 46 |
| 5 | 51 | | 0.8 | 0.2 | 2 | | 46 |
| 6 | 51 | | 0.8 | 0.2 | 2 | | 46 |
| 7 | 51 | | 0.8 | 0.2 | 2 | | 46 |
| 8 | 51 | | 0.8 | 0.2 | 3 | | 45 |
| 9 | 51 | | 0.8 | 0.2 | 3 | | 45 |
| 10 | | 52 | 0.8 | 0.2 | | 0.7 | 46.3 |
| 11 | | 52 | 0.8 | 0.2 | | 0.7 | 46.3 |
| 12 | | 52 | 0.8 | 0.2 | | 1.2 | 45.8 |
| 13 | | 52 | 0.8 | 0.2 | | 1.2 | 45.8 |

TABLE 2-continued

| | test conditions | | | |
|---|---|---|---|---|
| | Coating weight (g/m$^2$) | Temperature (° C.) | Residence time (seconds) | Humidity level (% of water molecules) |
| 8 | 200 | 120 | 300 | 16 |
| 9 | 300 | 120 | 300 | 23 |
| 10 | 300 | 120 | 200 | 23 |
| 11 | 300 | 140 | 100 | 68 |
| 12 | 700 | 120 | 300 | 23 |
| 13 | 700 | 140 | 200 | 68 |

The adhesive layers thus obtained are subjected to the tests described below.

180° Peel Test on a Stainless Steel Plate 20 Minutes:

The adhesive strength is evaluated by the 180° peel test on a stainless steel plate as described in FINAT method No. 1 published in the FINAT Technical Manual, 6$^{th}$ edition, 2001. FINAT is the international federation for self-adhesive label manufacturers and converters. The principle of this test is the following.

A test specimen in the form of a rectangular strip (25 mm×175 mm) is cut from the PET carrier coated with the cured composition obtained previously. This test specimen is, after the preparation thereof, stored for 24 hours at a temperature of 23° C. and in a 50% humidity atmosphere. It is then fastened over two-thirds of its length to a substrate constituted of a stainless steel plate. The assembly obtained is left for 20 minutes at room temperature. It is then placed in a tensile testing machine capable, starting from the end of the rectangular strip that is left free, of peeling or debonding the strip at an angle of 180° and with a separation rate of 300 mm per minute. The machine measures the force required to debond the strip under these conditions.

The corresponding results are expressed in N/cm and are indicated in table 3. The examples 2, 5 and 6 show a cohesive failure (CF), there is a rupture within the adhesive composition. On the contrary, the examples 1, 3, 4 and 7 to 13 show a clean panel (CP) which mean that the cross-linking is sufficiently high to avoid the rupture in the adhesive joint.

180° Peel Test on a Stainless Steel Plate 24 Hours:

The same test as before is performed on the adhesives of examples 1, 3, 4 and 7 to 13 but the test is conducted 2 days after their preparation and the assembly is left for 24 hours at room temperature.

The corresponding results are expressed in N/cm and are indicated in table 3, wherein the failure profile is also mentioned.

Tack Test (Also Known as Loop Test):

The tack is evaluated by the loop tack test described in FINAT method No. 9, the principle of which is the following.

A test specimen in the form of a rectangular strip (25 mm×175 mm) is cut from the PET carrier coated with the cured composition obtained previously. This test specimen is, after the preparation thereof, stored for 24 hours at a temperature of 23° C. and in a 50% humidity atmosphere. The 2 ends of this strip are joined so as to form a loop, the adhesive layer of which is facing outward. The 2 joined ends are placed in the movable jaw of a tensile testing machine capable of imposing a rate of displacement of 300 mm/minute along a vertical axis with the possibility of moving back and forth. The lower part of the loop placed in the vertical position is firstly put into contact with a horizontal glass plate measuring 25 mm by 30 mm over a square area measuring around 25 mm per side. Once this contact has occurred, the displacement direction of the jaw is reversed. The tack is the maximum value of the force needed for the loop to be completely debonded from the plate.

The corresponding results are expressed in N/cm and are indicated in table 3. The failure profile is also indicated in table 3. Indeed, when the test is performed with an article obtained by the process of examples 2, 5 and 6, residues persist onto the plate; those kinds of adhesives are not useful because of the residues of adhesive which can be transferred from the article to the fingers or to the environment surfaces, for example during storage and transport. On the contrary, for examples 1, 3, 4 and 7-10, there are no residues (CP) onto the glass plate in the end of the test.

Resistance Time of the Adhesive Joint to Static Shear at 23° C.:

The stability of the adhesive strength of the PET carrier coated with the cured composition is evaluated, no later than one hour after it is obtained, by a test which determines the resistance time of the adhesive joint to static shear at 23° C. Reference is made, for this test, to the FINAT method No. 8. The principle is the following.

A test specimen in the form of a rectangular strip (25 mm×75 mm) is cut from the PET support layer coated with the cured composition prepared previously, at most one hour after the preparation thereof. A square portion of 25 mm per side located at the end of the adhesive strip is fastened to a glass plate. The test plate thus obtained is maintained in a vertical position and the strip left free is connected to a weight of 1 kg. Under the effect of this weight, the adhesive joint which ensures the fastening of the strip to the plate is subjected to a shear stress. To better control this stress, the test plate is in fact placed so as to make an angle of 2° relative to the vertical.

The time taken for the strip to debond from the plate following the rupture of the adhesive joint under the effect of this stress is noted. This time is indicated in the table.

The corresponding results are shown in table 3. The self-adhesive articles of examples 1, 3, 4 and 7 to 13 have a good resistance to shear stress, even when the test is performed only one hour after the preparation of the article; indeed, the resistance to shear stress is greater than 10 days. On the contrary, in the process of comparative examples 2, 5 and 6, the obtained articles have a resistance to shear stress of less than 1 minute. This test demonstrates that in a non moisturized apparatus, the adhesive layer obtained after the curing step is not sufficiently cross-linked.

Resistance Time of the Adhesive Joint to Static Shear at 90° C.:

The same test as before is performed on the adhesives but the test is conducted 1 day after the preparation of those adhesives and the test plate submitted to a weight of 1 kg is maintained at a temperature of 90° C.

The results are shown in table 3 and confirm the good cross-linking of the adhesive layer in moisture-containing apparatus (examples 3, 4, 7 to 13).

TABLE 3

| | Test results | | | | |
|---|---|---|---|---|---|
| | Peel 180° 20 min (N/cm - failure profile) | Peel 180° 24 h (N/cm - failure profile) | Loop tack (N/cm - failure profile) | Shear Resistance at 23° C. | Shear Resistance at 90° C. |
| 1 | 12.0 - CP | 12.7 - CP | 15.9 - CP | >10 days | >24 h |
| 2 | 21.9 - CF | — | 34.1 - residues | <1 min | — |
| 3 | 11.5 - CP | 13.0 - CP | 14.5 - CP | >10 days | >24 h |

TABLE 3-continued

Test results

| | Peel 180° 20 min (N/cm - failure profile) | Peel 180° 24 h (N/cm - failure profile) | Loop tack (N/cm - failure profile) | Shear Resistance at 23° C. | Shear Resistance at 90° C. |
|---|---|---|---|---|---|
| 4 | 13.5 - CP | 12.1 - CP | 15.3 - CP | >10 days | >24 h |
| 5 | 34.8 - CF | — | 49.0 - residues | <1 min | — |
| 6 | 37.6 - CF | — | 41.5 - residues | <1 min | — |
| 7 | 25.6 - CP | 26.4 - CP | 33.1 - CP | >10 days | >24 h |
| 8 | 23.2 - CP | 22.7 - CP | 31.0 - CP | >10 days | >24 h |
| 9 | 28.5 - CP | 27.9 - CP | 41.1 - CP | >10 days | >24 h |
| 10 | 29.8 - CP | 27.8 - CP | 38.8 - CP | >10 days | >24 h |
| 11 | 29.6 - CP | 28.9 - CP | 41.8 - CP | >10 days | >24 h |
| 12 | 35.9 - CP | 37.0 - CP | 43.3 - CP | >10 days | >24 h |
| 13 | 36.7 - CP | 39.2 - CP | 44.1 - CP | >10 days | >24 h |

CP = Clean Panel;
CF = Cohesive Failure.
Standard deviation values are typically in the range of 1 to 3 N/cm for both peel and loop tack results.

Comparative example 1 shows that when the curing performed at atmospheric humidity, such as 2% of molecules are water molecules, a longer residence time is needed, here 30 seconds, than when curing is performed within a humid atmosphere, in which 60% of molecules are water molecules, such as in examples 3 and 4 in which the residence time is only 20 seconds.

Comparative example 6 shows that a higher temperature, such as 140° C., does not enable to obtain a sufficiently cured article. Indeed, comparative example 6 has a Shear Resistance time at 23° C. of less than 1 minute and the Peel Test à180° C. leads to a cohesive failure.

The invention claimed is:

1. Self-adhesive article comprising at least a substrate and an adhesive layer, wherein the coating weight of said adhesive layer is between 600 and 1500 g/m², wherein the adhesive layer was applied in one step, said adhesive layer being a cured adhesive composition comprising a silyl-containing polymer, a tackifying resin and a catalyst, and wherein the self-adhesive article is obtained by a process comprising:
a) conditioning an adhesive composition comprising at least a silyl-containing polymer, a tackifying resin and a catalyst, at a temperature of between 20 and 160° C.;
b) coating in a single step the adhesive composition onto:
 b1) at least a part of the substrate; or
 b2) onto a non-sticking support;
c) submitting the article obtained at step b) to a temperature between 20 and 200° C. and to a humidity level characterized by an atmosphere in which between 5 and 90% of the molecules are water molecules to obtain the adhesive layer; and if b2) is chosen, then
d) depositing the substrate onto the adhesive composition before step c) or onto the adhesive layer after step c), wherein the self-adhesive article has adhesion to a surface characterized by a shear resistance, determined at ambient temperature and under 1 kg, of higher than 1 day.

2. Self-adhesive article according to claim 1, wherein the coating weight of the adhesive layer is between 800 and 1300 g/m².

3. Self-adhesive article according to claim 1, wherein the adhesive layer is further covered with a release liner.

4. Self-adhesive article according to claim 1, wherein the back side of the substrate is a non-sticking layer.

5. Self-adhesive article according to claim 1, wherein the silyl-containing polymer is a silyl-terminated polyurethane having the following formula (Ia):

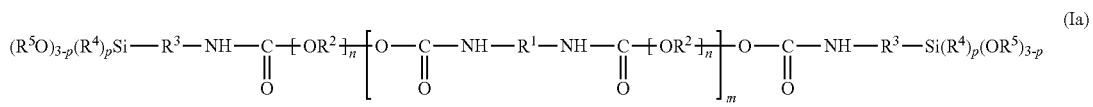

wherein:
R¹ represents a hydrocarbon-based divalent radical comprising from 5 to 15 carbon atoms which may be aromatic or aliphatic, linear, branched or cyclic,
R² represents a linear or branched alkylene divalent radical comprising from 1 to 4 carbon atoms,
R³ represents a linear alkylene divalent radical comprising from 1 to 3 carbon atoms,
R⁴ and R⁵, which are identical or different, each represent a linear or branched alkyl radical having 1 to 4 carbon atoms, with the possibility, when there are several R⁴ (or R⁵) radicals, that these are identical or different,
n is an integer such that the number-average molecular weight of the polyether block of formula —[OR²]n— is between 300 Da and 30 kDa,
m is an integer such that the number-average molecular weight of the polymer of formula (Ia) is between 600 Da and 60 kDa;
p is an integer equal to 0, 1 or 2.

6. Self-adhesive article according to claim 1, wherein the silyl-containing polymer is a silyl-terminated polyether having the following formula (Ib):

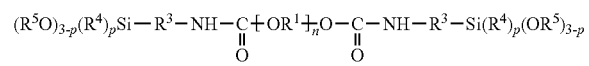

wherein:
R¹ represents a linear or branched alkylene divalent radical comprising from 1 to 4 carbon atoms,
R³ represents a linear alkylene divalent radical comprising from 1 to 6 carbon atoms, $R^4$ and $R^5$, which are identical or different, each represent a linear or branched alkyl radical having 1 to 4 carbon atoms, with the possibility, when there are several $R^4$ (or $R^5$) radicals, that these are identical or different, n is an integer such that the number average molecular weight of the polymer of formula (Ib) is between 20 kDa and 40 kDa, p is an integer equal to 0, 1 or 2.

7. Process for manufacturing the self-adhesive article comprising at least a substrate and an adhesive layer of claim 1, said process comprising the steps of:
   a) conditioning an adhesive composition, comprising at least a silyl-containing polymer, a tackifying resin and a catalyst, at a temperature of between 20 and 160° C.;
   b) coating the adhesive composition onto:
      b1) at least a part of the substrate; or
      b2) onto a non-sticking support;
   c) submitting the article obtained at step b) to a temperature between 20 and 200° C. and to a humidity level characterized by an atmosphere in which between 5 and 90% of the molecules are water molecules to obtain an adhesive layer; and
   if b2) is chosen, then
   d) depositing the substrate onto the adhesive composition before step c) or onto the adhesive layer after step c).

8. Process according to claim 7, further comprising a step e) of submitting the article obtained after step c) to a temperature between 20 and 200° C.

9. Process according to claim 8, wherein the article obtained after step c) is submitted to a temperature comprised between 30 and 180° C.

10. Process according to claim 7, wherein the coating at step b1) is performed onto at least 50% of the substrate.

11. Process according to claim 10, wherein the coating at step b1) is performed on at least 75% of the substrate.

12. Process according to claim 7 wherein the coating of the substrate is performed onto at least a part of both sides of the substrate.

13. Process according to claim 7, wherein the substrate is a grid or mesh or a non-woven substrate.

14. Process according to claim 7, wherein at step b1) or b2) the quantity of adhesive composition coated on the substrate or non-sticking support, is between 10 and 1500 $g/m^2$.

15. Process according to claim 14, wherein at step b1) or b2) the quantity of adhesive composition coated on the substrate or non-sticking support, is between 50 and 1400 $g/m^2$.

16. Process according to claim 7, wherein at step c) the humidity level is characterized by an atmosphere in which between 10 and 90% of the molecules are water molecules and the temperature is between 30 and 180° C.

17. Process according to claim 16, wherein at step c) the humidity level is characterized by an atmosphere in which between 15 and 70% of the molecules are water molecules and the temperature is between 40 and 160° C.

18. Process according to claim 7, wherein step c) is performed in an apparatus equipped with an external ventilation circuit comprising a heat exchanger.

19. Process according to claim 18, wherein steam is injected into the external ventilation circuit.

20. Process for bonding a self-adhesive article according to claim 1 onto a surface comprising the steps of:
   a) removing a protective non-sticking layer from said adhesive layer when said protective non-sticking layer is present;
   b) applying the article onto the surface; and
   c) applying a pressure onto the article.

21. Process according to claim 20, wherein the adhesion of the self-adhesive article to the surface is characterized by a shear resistance at ambient temperature under 1 kg of higher than 10 minutes.

22. Process according to claim 21, wherein the adhesion of the self-adhesive article to the surface is characterized by a shear resistance at ambient temperature under 1 kg of higher than 1 day.

* * * * *